United States Patent
Anderson et al.

(10) Patent No.: US 6,546,176 B2
(45) Date of Patent: Apr. 8, 2003

(54) OPTICAL FIBER CABLE AND CORE WITH A REINFORCED BUFFER TUBE HAVING VISIBLE STRENGTH MEMBERS AND METHODS OF MANUFACTURE THEREOF

(75) Inventors: Aaron M. Anderson, Batesburg, SC (US); Ben H. Wells, Irmo, SC (US); Roger Vaughn, Columbia, SC (US)

(73) Assignee: Pirelli Cable Corporation, Columbia, SC (US)

( * ) Notice: Subject to any disclaimer, the term of this patent is extended or adjusted under 35 U.S.C. 154(b) by 0 days.

(21) Appl. No.: 10/059,530

(22) Filed: Jan. 29, 2002

(65) Prior Publication Data

US 2002/0126970 A1 Sep. 12, 2002

Related U.S. Application Data

(62) Division of application No. 09/205,825, filed on Dec. 4, 1998, now Pat. No. 6,377,738.

(51) Int. Cl.[7] .................................................. G02B 6/44
(52) U.S. Cl. ........................ 385/113; 385/100; 385/106; 385/107; 385/114
(58) Field of Search ................................ 385/100, 106, 385/107, 109–114, 101–105, 108; 264/1.29

(56) References Cited

U.S. PATENT DOCUMENTS

| | | | | |
|---|---|---|---|---|
| 4,645,298 A | * | 2/1987 | Gartside, III | 350/96.23 |
| 5,181,268 A | * | 1/1993 | Chien | 385/128 |
| 5,320,788 A | * | 6/1994 | Schneider et al. | 264/1.5 |
| 5,561,729 A | * | 10/1996 | Parris | 385/113 |
| 5,651,081 A | * | 7/1997 | Blew et al. | 385/101 |
| 5,658,519 A | * | 8/1997 | March et al. | 264/2.77 |
| 5,905,834 A | * | 5/1999 | Anderson et al. | 385/111 |
| 5,970,196 A | * | 10/1999 | Greveling et al. | 385/114 |
| 6,041,153 A | * | 3/2000 | Yang | 385/109 |
| 6,101,305 A | * | 8/2000 | Wagman et al. | 385/113 |

* cited by examiner

Primary Examiner—Frank G. Font
Assistant Examiner—Michael P. Mooney
(74) Attorney, Agent, or Firm—L. P. Brooks; Norris, McLaughlin & Marcus

(57) ABSTRACT

An optical fiber cable core includes a buffer tube containing at least one optical fiber and reinforced by at least two substantially radially incompressible longitudinal strength members, each strength member having surface portions radially outermost with respect to the tube axis which are at or protrude from the exterior surface of the buffer tube. If the strength members protrude from the exterior surface of the buffer tube, less than 50%, and preferably less than 20%, of the outer surface of the strength members protrudes from the exterior surface of the buffer tube. The positions of the strength members can be readily determined, can be visible and can be easily removed from the buffer tube prior to slitting the buffer tube to achieve midspan access. The core can include a buffer tube having an inner tubular portion, an outer tubular portion including the strength members, and a release agent between the tubular portions to enable easy separation of the tubular portions so that conventional slitting tools can be used to gain midspan access. Also, an optical fiber cable including the core and methods of manufacturing a reinforced buffer tube are disclosed.

11 Claims, 3 Drawing Sheets

OPTICAL FIBER CABLE AND CORE WITH A REINFORCED BUFFER TUBE HAVING VISIBLE STRENGTH MEMBERS AND METHODS OF MANUFACTURE THEREOF

This application is a division of Ser. No. 09/205,825 filed Dec. 14, 1998 now U.S. Pat. No. 6,377,738.

FIELD OF THE INVENTION

This invention relates to optical fiber cables and, more particularly, to optical fiber cables comprising a central buffer tube containing one or more optical fibers, reinforced by longitudinal strength members to protect the optical fibers from forces, such as installation and thermally induced expansion and contraction of the buffer tubes.

BACKGROUND OF THE INVENTION

Optical fibers are relatively fragile and must be protected during the manufacture, handling and installation of cables including such fibers. A variety of protective measures are therefore provided in cables containing optical fibers. For example, to allow the cable to move or be flexed a certain degree by external forces or by thermal expansion and contraction without stressing or microbending the optical fibers, the optical fiber or fibers are typically enclosed in a plastic buffer tube having a bore of a cross-sectional area larger than the cross-sectional area of the fiber or fibers within it. This is referred to as a "loose" configuration. The material of the tube typically has a relatively high temperature coefficient of expansion and a relatively low tensile strength. Frequently, the length of the optical fibers is greater than the length of the tube, referred to as excess fiber length. An optical fiber cable may include one or several buffer tubes, each containing one or a plurality of optical fibers. The plurality of optical fibers may be in the form of individual fibers, an optical fiber ribbon or a stack of optical fiber ribbons, for example.

To further resist thermal expansion and contraction, as well as longitudinal loads which may be applied during manufacture, handling and installation of the optical fiber cable, strength members of metal wires or high strength non-metallic rods or fibers, such as glass rods or fibers may be embedded in the material of the buffer tube. See, for example, U.K. Patent Application GB 2,215,081, which provides two diametrically opposed wires or high tensile plastic filaments entirely within the walls of the buffer tubes. U.S. Pat. No. 4,898,451 also shows a plurality of flexible fibers of aramid, steel or glass, completely encircled by the plastic of the buffer tubes contained within an optical fiber cable.

Strength members have also been provided in grooves in the outer surface of the buffer tubes. See, for example, U.S. Pat. Nos. 4,804,245 and 4,610,505. In both patents, the strength members are held in the groves by an outer wrapping. In the '245 patent, the shape of the grooves and the physical properties of the strength members are such that there is little resistance to compression forces. Also, the optical fibers are not encircled by, or centrally disposed with respect to the buffer tube. The '505 patent relies on the wrapping to provide coupling between the strength members and the tube and the optical fiber is not loosely contained in a buffer tube. The requirement of such a wrapping complicates the structure of the cable and could increase its diameter.

In an alternative configuration disclosed in U.S. Pat. No. 5,509,097 ("the '097 patent"), assigned to the assignee of the present invention and incorporated by reference herein, an optical fiber cable is disclosed including a buffer tube loosely enclosing optical fibers. Two diametrically opposed, longitudinally extending strength members are tightly coupled to the buffer tube by an adhesive or a cord to resist tensile and compression forces applied to the buffer tube and prevent buckling of the strength members. The core of the cable can also include a layer of extruded plastic which presses the strength members toward the tube to increase the coupling between the strength members and the buffer tube and which opposes buckling and kinking of the strength members.

When the strength members are at the outside of the buffer tube as shown in the '097 patent, the structure is not circular in cross-section. If the structure shown in the '097 patent is to be covered by other layers, the outer surface may have "lumps" at the location of the strength member, and it may be desirable to have an outer surface corresponding substantially to the outer surface of the cylinder. Furthermore, if the strength members are entirely outside the outer surface of the buffer tube, special apparatus is required in applying a plastic layer over the combination of the buffer tube and the strength members, and the diameter if the jacket may be increased. If the diameter of the layer is increased, the diameter of the cable is increased which is undesirable. If the layer is omitted, it becomes difficult to apply the armoring, etc., because the strength members, being at the outer surface of the buffer tube, constitute protrusions and deviations from a cylindrical surface to which the armoring, etc., must conform. It can be desirable, in some cases, to omit the layer and to minimize the extent to which the strength members extend outwardly from the buffer tube without losing the benefits of the structure shown in the '097 patent and particularly, the tight coupling of the strength members to the buffer tube.

If the strength members are completely encircled by a substantial amount of the buffer tube material, it is difficult to main the strength members in the correct positions within the buffer tube, and it can be necessary to increase the thickness of the buffer tube wall because of the presence of the strength members therein which increases the amount of buffer tube material required and increases the diameter of the buffer tube and hence, the diameter of an armored cable incorporating such structure. Completely embedded strength members can also interfere with gaining midspan access to the optical fibers during splicing because the location of the strength member is not visible. Further, attempting to remove these strength members necessarily damages the structural integrity of the tube, increasing the risk of damage (i.e. kinking, crushing) to the optical fibers as the midspan operation continues. Examples of cables with completely embedded strength members have been described hereinbefore.

It is known to include water blocking compound within the buffer tubes for moisture protection. The water blocking compound, which permits the optical fibers to move within the buffer tube, may be a gel or grease-like, and non-hygroscopic and/or thixotropic. Any spaces between the buffer tube and the outer jacket can also be filled with a water blocking compound. Further moisture protection is provided by water blocking yarn and/or water blocking tape disposed between the buffer tube and the outer jacket. Such yarn or tape may be provided within the buffer tube and the outer jacket. Such yarn or tape may be provided within the buffer tube instead of the water blocking compound. See, for example, U.S. Pat. No. 5,071,221.

Additional layers of materials, such as armoring for crushing and rodent protection, can also be provided between the buffer tube and outer jacket. Longitudinal ripcords are typically provided to assist in opening the optical fiber cable jacket and armor, if provided.

In a telecommunications network, certain optical fibers within an optical fiber cable may be spliced to other optical fibers, such as optical fibers leading to particular terminal locations. The optical fibers may also need to be accessed to check for faults. To achieve midspan access to the particular optical fibers to be spliced or checked at a particular location along the cable, the jacket and the buffer tube containing the optical fibers and any intervening layers must be opened. Typically, the optical fiber cable is opened by accessing and pulling the ripcord to open the jacket and armor if present, and cutting through or removing other layers of material, such as water blocking tape, to expose the buffer tube of interest.

When strength members are embedded in the cable jacket, they are not tightly coupled to the buffer tube and the strength members in the region of the jacket to be opened must be removed before the jacket and armor can be opened. A short section of the jacket material directly over those strength members is first removed by shaving with a sheath knife. The strength members are then pried away from the jacket to expose the underlying layers. Since the length of the cable section to be opened, which usually is 8–10 feet in length, it is necessary that a corresponding length of the strength members also be removed from this section. Such removal of the strength members is a difficult and labor intensive operation. After the buffer tube is exposed, the buffer tube may be slit in a known fashion to access the optical fibers contained therein. The optical fiber cables can be secured within a splice enclosure during the midspan access and splicing procedure, as is known in the art. The splice enclosure is used to seal the cable when the process is completed. Accordingly, while strength members in the jacket can be used, it is desirable that the strength members be directly coupled to the buffer tube.

An optical fiber cable with strength members tightly coupled to the buffer tube which resist thermal expansion and contraction of the buffer tube, as well as tensile forces, wherein the strength members are readily apparent and do not interfere with gaining midspan access and which has reduced manufacturing problems without increasing the cable diameter, would be advantageous.

SUMMARY OF THE INVENTION

In accordance with one embodiment of the present invention, an optical fiber cable core comprises a buffer tube of a plastic material loosely containing and completely encircling at least one optical fiber. The buffer tube has a longitudinal axis, a nominal outer periphery, and has at least two strength members tightly coupled to the buffer tube and with surface portions thereof proximate the nominal outer periphery of the buffer tube. If the strength members have surface portions outwardly of the nominal periphery of the buffer tube, lip portions of buffer tube material extend towards each other and engage the strength members. The strength members extend longitudinally of the core and substantially parallel to the longitudinal axis of the buffer tube. Thus, each strength member is partially embedded in the buffer tube such that the lip portions extend over and engage a portion of the outer surface of the strength members. Buffer tube material partially surrounding and engaging the strength members, including the lip portions, applies radially inward forces to the strength members, thereby tightly coupling the strength members to the buffer tube material, to provide resistance to contraction and expansion forces, as described in the '097 patent. The radially outermost surface portion of each strength member, i.e. in the radial direction with respect to the longitudinal axis of the buffer tube, may be substantially tangent to or protrude beyond the outer surface of the buffer tube such that less than half of the outer surface of each of the strength members protrudes beyond the nominal outer periphery of the buffer tube. If portions of the outer surface of the strength members protrude outwardly of the nominal periphery of the buffer tube, longitudinal portions of one or both of the strength members can be easily pulled away from the buffer tube by pushing the buffer tube material adjacent to the strength members, e.g. the lips, away from the strength members by one's fingers without the use of tools. Removal of one or both of the strength members enables midspan access to the optical fiber or fibers within the buffer tube without cutting the strength members or damaging the structural integrity of the tube. Also, since the strength members are visible, they can be avoided during slitting of the buffer tube by positioning the blade of the slitting tool between the strength members. Therefore, removal of the strength members may not be required. Of course, if it is desired to cut the strength members during splicing of the optical fibers, that can be easily done, as well.

In order to provide the desired coupling between the strength members and the buffer tube, the material of the buffer tube must apply pressure to the strength members in the direction radially of the axis of the strength member. Thus, the resistance to slipping between the strength member and the buffer tube depends on the force directed by the material of the buffer tube radially toward the axis of the strength member, the coefficient of friction of the materials of the strength members and the buffer tube and the extent of the surface of the strength member to which the forces are applied.

Preferably, in order to provide the desired coupling, more than 50% of the surface of the strength members is contacted by material of the buffer tube, but except possibly for thin film of the buffer tube material which does not prevent identification of the location of the strength members, which applies insignificant forces to the strength members and which overlies the radially outermost, with respect to the buffer tube axis, surface portions of the strength members, the strength members are not entirely surrounded by buffer tube material.

Preferably, less than about 20% and more preferably, less than about 10%, of the outer surface of each of the strength members protrudes beyond the nominal outer periphery of the buffer tube. However, due to manufacturing tolerances, a thin film of buffer tube material, which can easily be removed and which does not obscure the strength members, may cover the outermost surface portions of the strength members. The film has a thickness which is small compared to the wall thickness of the buffer tube wall. With or without the film, the strength members can be readily located and the desired coupling between the strength members and the buffer tube is obtained.

By so coupling the strength members to the buffer tube, the resistance of the strength members to compression forces is improved because the buffer tube resists bending and kinking of the strength members described in the '097 patent. Thus, although the methods described in the '097 patent, e.g. adhesive or a cord, can also be used with the embodiments of the invention to resist bending and kinking and thereby increase the compression resistance of strength members of a small diameter, the coupling of the strength members to the buffer tube provided by the invention can be sufficient, by itself, to provide the desired resistance to bending and kinking especially if the strength-member-buffer tube structure is encircled by an extruded layer of plastic material contacting the buffer tube and the strength members.

Preferably, two diametrically opposed strength members are provided. The strength members can comprise metallic or non-metallic materials which are sufficiently incompressible to the direction radially of the axis of the strength member to permit the desired coupling of the strength member to the buffer tube. For example, the strength members can be metal or glass rods, but cannot be compressible fibers, e.g. fibers which are merely twisted or stranded together. To increase the coupling between the strength members and the buffer tube, the strength members can be coated with a material which bonds to the strength members and which will bond to the buffer tube during extrusion of the buffer tube material, e.g. an adhesive or material of the buffer tube.

Preferably, the buffer tube contains a plurality of optical fibers in the form of a plurality of optical fiber ribbons forming an optical fiber stack, which is completely enclosed by a wall of the buffer tube. Preferably, water blocking material is provided within the buffer tube.

If it is necessary to accommodate the strength members, e.g. if the diameter of the strength members is such that the buffer tube wall is weakened, the buffer tube of the present invention may have thicker walls and have a larger diameter than conventional buffer tubes. This could prevent the use of conventional slitting tools to gain midspan access, such conventional tools being designed to slit buffer tubes having a relatively small wall thickness. In such case, the buffer tube can be made with two layers, an inner tubular portion and an outer tubular portion, each with a radial dimension which can be slit by a conventional tool. With two such layers, preferably, the inner tubular portion is coated, prior to extrusion of the outer tubular portion over the coated inner portion, with a material which permits the inner and outer portions to be pulled apart easily in a direction perpendicular to their adjacent surfaces, but which does not significantly reduce the resistance of the two portions to slippage relative to each other in the direction longitudinally of the tubes. Portions of the outer tubular portion can then be easily removed from the inner tubular portion, which may be of a conventional thickness and diameter, enabling the use of conventional slitting tools to gain access to the optical fibers through the inner tubular portion.

In accordance with another embodiment of the present invention, an optical fiber cable comprises the optical fiber core described hereinbefore, and at least an outerjacket encircling the buffer tube and strength members. Preferably, a water blocking tape or water absorbing yarn is provided between the jacket and buffer tube. Preferably, armor shielding is provided between the jacket and the water blocking tape, if present. If no water blocking tape is provided, the armor engages both the jacket and the buffer tube.

Preferably, the space within the buffer tube not occupied by the optical fibers or optical ribbon, are filled with a water blocking material, such as a gel, which is substantially incompressible and which resists radially inward forces applied to the buffer tube and hence, the strength members. In this embodiment, radially inward forces applied by the jacket, or by a cord as described in the '097 patent, increases the coupling between the strength members and the buffer tube.

In accordance with a preferred embodiment of the invention, a reinforced buffer tube, which can be used in an optical fiber cable, is manufactured by hot extruding a buffer tube with longitudinal strength members proximate, tangent to or protruding from the nominal outer periphery of the tube and cooling the extruded tube, causing contraction of the buffer tube material. The buffer tube, which usually is made of plastic, is formed with a material having a coefficient of contraction greater than the coefficient of contraction of the strength members. The buffer tube wall and the wall of the strength members are selected with respect to coefficients of contraction so that when the buffer tube is cooled after the heated buffer tube wall is applied, the buffer tube material contracts and grips the strength members, applying sufficient radially directed forces to the strength members to prevent longitudinal slippage of the strength members with respect to the buffer tube under normal field conditions. Lip portions of buffer tube material extending towards each other and engaging the strength members, can be formed proximate radially outermost surface portions of each of said strength members, to further couple the strength members to the buffer tube material as the buffer tube material contracts during cooling. When so manufactured, less than half of the outer surface of the strength members protrude beyond the nominal outer periphery of the buffer tube. Radially outermost surface portions of the strength members are substantially tangent to or protrude outwardly from the buffer tube.

The manufacture of the reinforced buffer tube can include first extruding an inner tubular portion and then applying the strength members while extruding, with heating, an outer tubular portion over the inner tubular portion. The thickness of the outer tubular portion is selected so that the strength members are positioned within the outer tubular portion with portions of the outer surface of the strength members closely adjacent to an other surface of the outer tubular portion. As the outer tubular portion cools it contracts, thereby positioning the strength members substantially tangent to or protruding beyond the nominal outer periphery of the buffer tube, as described above, and becoming tightly coupled to the outer and inner tubular portions. As described hereinbefore, prior to extrusion of the outer tubular portion, the inner tubular portion may be coated with a material which enables easy removal of the outer tubular portion from the inner tubular portion and yet resists longitudinal slipping between the inner and outer tubes so that conventional slitting tools can be used to gain midspan access to the optical fibers through the inner tubular portion.

DESCRIPTION OF THE DRAWINGS

Other features of the present invention will be more readily understood from the following detailed description of specific embodiments thereof when read in conjunction with the accompanying drawings, in which.

DESCRIPTION OF THE INVENTION

Figure 1:
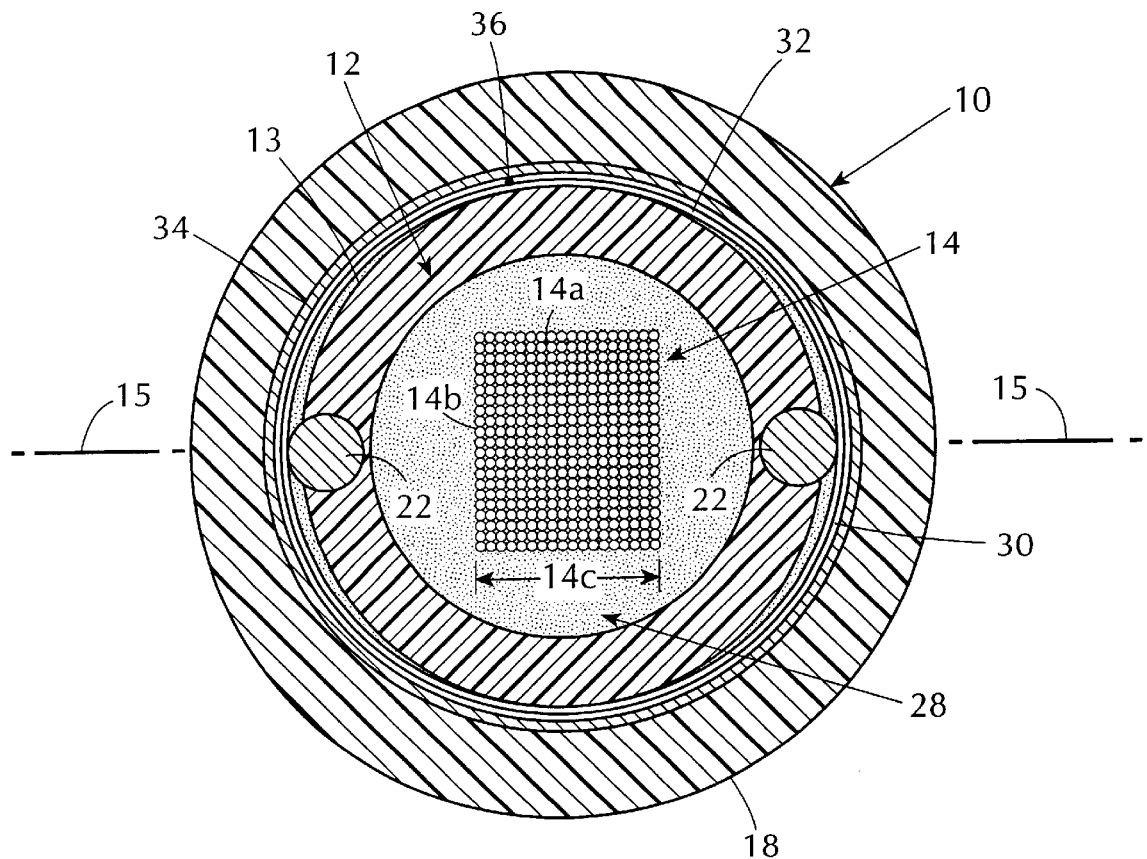
FIG. 1 is an enlarged cross-sectional view of an optical fiber cable in accordance with the present invention, wherein portions of the strength members protrude externally of the buffer tube.

FIG. 1 is a cross-sectional view of an optical fiber cable 10 in accordance with one embodiment of the present invention, comprising a plastic buffer tube 12 containing at least one optical fiber 14a. The buffer tube 12 can contain a single optical fiber, a plurality of stranded or non-stranded optical fibers, one or more optical fiber ribbons, or an optical fiber bundle.

Preferably, as shown in FIG. 1, a plurality of optical fiber ribbons 14b in the form of a stack 14 are contained within the inner surface of the tubular wall of the buffer tube tube 12 which defines the bore of the buffer tube tube 12 and which completely encircles the stack 14 with the optical fiber ribbons 14b extending in the direction of the longitudinal axis of, the buffer tube 12. The plurality of ribbons can be merely superimposed and free to move with respect to each other or can be secured to each other in any conventional manner, such as by an adhesive or cord binder. Each ribbon comprises a plurality of optical fibers 14a in side-by-side, laterally spaced relation and encased, or embedded, in a plastic material. Such ribbons are well-known in the art. The ribbons may be twisted around the axis of the stack 14. The ribbons may also be twisted around the longitudinal axis of the buffer tube 12, either helically or in oscillating lay. Each of the optical fibers 14a typically comprises a central glass portion, such as silica glass, surrounded by a cladding for optical purposes and one or more coatings, such as plastic coatings, for physical protection. Preferably, the bore of the buffer tube tube 12 and an outer peripheral surface of the tube tube 12 are of a generally circular shape in cross-section but the bore of the buffer tube tube 12 may have other shapes, such as rectangular. Except where it is interrupted by a strength member 22, as discussed hereinbelow, the outer surface of the buffer tube tube 12 conforms to the outer surface of a cylinder. However, if it is not necessary to have such an outer surface, the other advantages of the invention can be obtained if the outer surface of the buffer tube tube 12 has a cross-sectional shape other than circular, e.g. the shape of an oval.

The buffer tube tube 12 has a bore or inner diameter selected so that the cross-sectional area of the bore is greater than the cross-sectional area of the stack 14, or other arrangement of optical fiber or fibers therein, so that the optical fiber 14a, fibers or ribbons are loosely contained in the buffer tube 12. The ribbons 14b containing the optical fibers 14a in the stack 14 are thereby free to move longitudinally and transversely with respect to the buffer tube 12. Preferably, there is also excess ribbon, and hence, fiber length, such that the length of the stack 14 or other such collection of optical fibers 14a is greater than the longitudinal rectilinear length of the axis of the buffer tube 12.

Preferably, the ratio of the cross-sectional area of the stack 14 to the cross-sectional area of the inner bore is about 0.5 and the length of the stack 14 is equal to or exceeds the length of the buffer tube tube 12 by up to about 0.15% to 0.35%±05%. Any expansion and contraction of the buffer tube tube 12 which may not be prevented by the strength members 22 hereinafter described does not, therefore, apply significant forces to the ribbons 14b. However, if the strength members 22 provide sufficient protection with respect to expansion and contraction of the buffer tube, the optical fibers 14a can have the same length as the length of the buffer tube tube 12 or even can be shorter than the length of the buffer tube 12.

The buffer tube tube 12 preferably comprises a plastic material, such as high density polyethylene ("HDPE"), polybutene terephthalate, polypropylene, polyvinylchloride ("PVC") or poly-methylpentene. HDPE is preferred. The plastic material for the buffer tube preferably has a Young's Modulus in the range of from about 20,000 to about 500,000 psi. The buffer tube tube 12 can also be a metallic or composite material, such as an epoxy mixed with glass fibers.

An outer jacket 18 encircles the buffer tube 12. The outer jacket 18 is also preferably a plastic material. Medium density polyethylene ("MDPE") can be used, for example. As with the buffer tube 12, metallic or composite materials may also be used.

Preferably, one or more layers of an armor shield 34 are provided adjacent to the inner surface of the outer jacket 18 to provide protection against crushing or rodents, for example. The armor may be transversely corrugated or uncorrugated. A corrugated armor shield is described in said U.S. Pat. No. 5,509,097. Armor shields 34 typically have a thickness of about 0.006 inches. The armor shield 34 and the outer jacket 18, by exerting radially inward forces, can also serve to increase the resistance of the strength members 22 to buckling or kinking, but since the armor shields 34 are typically relatively thin, they do not provide significant resistance to longitudinal compression caused by contraction of the buffer tube 12. This is particularly true of corrugated armor shields.

A satisfactory steel tape for the shield 34 can be obtained from the Dow Chemical Company, Midland, Mich., under the trademark ZETABON. The tape is a carbon steel tape coated on both sides with an adherent ethylene copolymer. The tape thickness is about 0.006 inches and the thickness of the coatings is about 0.0023 inches. The yield strength is stated to be about 530 sq. in/lb., and it is supplied in widths from ½ inch to tube 12 inches.

In accordance with the present invention, the buffer tube tube 12 is reinforced by at least two longitudinally extending strength members 22, each of which is at least partially embedded in the buffer tube tube 12 and extends substantially parallel to the longitudinal axis of the buffer tube 12. Each strength member has a radially outermost surface portion, defined with respect to the longitudinal axis of the buffer tube 12, which is substantially tangent to or protrudes outwardly beyond what would be the uninterrupted outer surface 13 of the buffer tube 12. In the absence of the strength members 22, the outer surface 13 of the buffer tube tube 12 would be continuous and conform substantially to the outer surface of a cylinder. For convenience, such outer surface of the buffer tube tube 12 will be referred to as the "nominal" outer surface or periphery of the buffer tube tube 12 and the position of the strength members 22 will be related to the nominal outer surface of the buffer tube 12.

Figure 1A:
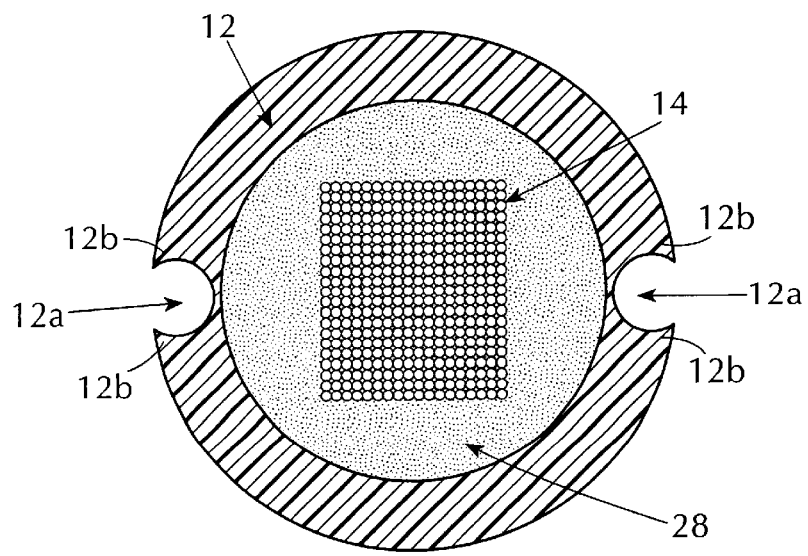
FIG. 1A is an enlarged cross-sectional view of the buffer tube in FIG. 1, with the strength members removed for illustrative purposes.
Figure 3:
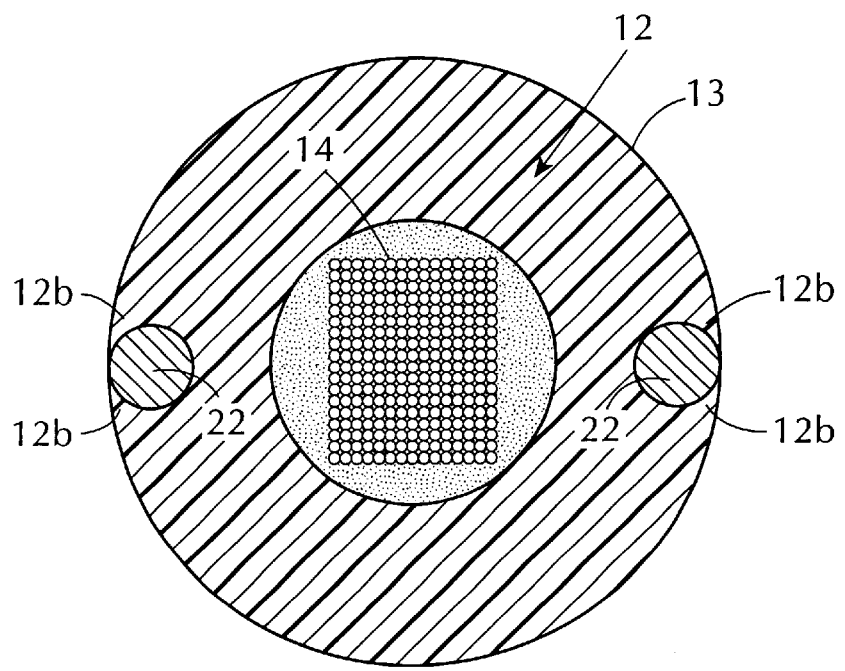
FIG. 3 is an enlarged cross-sectional view of a further embodiment of a buffer tube with optical fiber ribbons therein for use in an optical fiber cable in accordance with the present invention, including strength members which have outermost surface portions tangent to the periphery of the buffer tube.

FIG. 1A illustrates the buffer tube tube 12 and the optical fiber stack 14 with the strength members 22 removed. Thus, there are grooves 12a in the buffer tube wall. Buffer tube material proximate the radially outermost surface portion of each groove 12a, defined with respect to the longitudinal axis of the buffer tube 12, form lip portions 12b which extend towards each other, over the grooves 12a. Prior to removal of the strength members 22, the strength members 22 are at least partially embedded within the buffer tube such that the lip portions 12b extend over and engage a portion of the outer surface of the strength members. Prior to the removal of the strength members 22, buffer tube material, including the lip portions 12b, partially surround and engage the strength members 22, and apply radially inward forces to the strength members 22, tightly coupling the strength members to the buffer tube material, to provide resistance to contraction and expansion forces, as described in the '097 patent. The strength members 22 may be substantially tangent to or protrude beyond the nominal outer periphery of the buffer tube 12. The buffer tube material, including the lip portions 12b, encircles more than 50% of the outer surface of the strength members 22 and less than half of the outer surface of the strength members thereby protrudes beyond the nominal outer periphery of the buffer tube 12. Preferably, the strength members 22 have a substantially circular cross-section. FIG. 1 shows the radially outermost surface portions of the strength members 22, about one-third of the surface of the strength members 22 in FIG. 1, protruding outwardly beyond the nominal outer surface of the buffer tube 12. FIG. 3 shows the strength members 22 substantially tangent to the nominal outer surface of the buffer tube 12. In FIG. 3, the lip portions 12b extend completely or almost completely over each strength member 22. Whether the strength members 22 protrude beyond the nominal outer periphery of the buffer tube 12 or are substantially tangent to the nominal outer periphery of the buffer tube 12, the strength members 22 are visible to the naked eye when any surrounding layers of the optical fiber cable 10 are removed. Longitudinally extending portions of the strength members 22 may be readily removed from the buffer tube tube 12 without the use of tools, e.g. by pushing the portions of the buffer tube tube 12 adjacent to and at the sides of the strength members 22 radially inward with one's fingers. The removed portion or portions may then be secured within a splice enclosure or otherwise processed prior to slitting of the buffer tube to gain midspan access to the optical fibers 14a within the buffer tube 12. The buffer tube tube 12 may then be slit with a jacket slitting tool with an adjustable blade placed within and moved along a groove left by a removed portion of the strength member 22.

While it is preferred that the strength members have a substantially circular cross-section, the strength members may have cross-sections of other shapes, as long as in the embodiment of FIG. 1, the lip portions 12b can extend over the strength members 22, and engage a portion of the strength members.

If there is sufficient room between the strength members 22, the strength members 22 can also be easily avoided while slitting the buffer tube tube 12 by positioning the slitting tool such that its blade is between the strength members 22. Removal of one or both of the strength members 22 may not, therefore, be necessary. Preferably, only two strength members 22 are provided, in diametrically opposed positions, as shown in FIG. 1. In such case, there will be sufficient space between the strength members 22 to slit the buffer tube tube 12 without removing the strength members 22. In certain cases, it may be desirable to cut one or both of the strength members 22 during splicing. Since the strength members 22 are visible and readily removed, this procedure is expedited, as well. After the desired optical fiber splice has been made and the buffer tube tube 12 is sealed, the portions of the strength members 22 at the splice can be pressed back into the grooves in buffer tube 12 and if the strength members 22 have not been cut, the functions of the strength members 22 will be restored.

Figure 2:
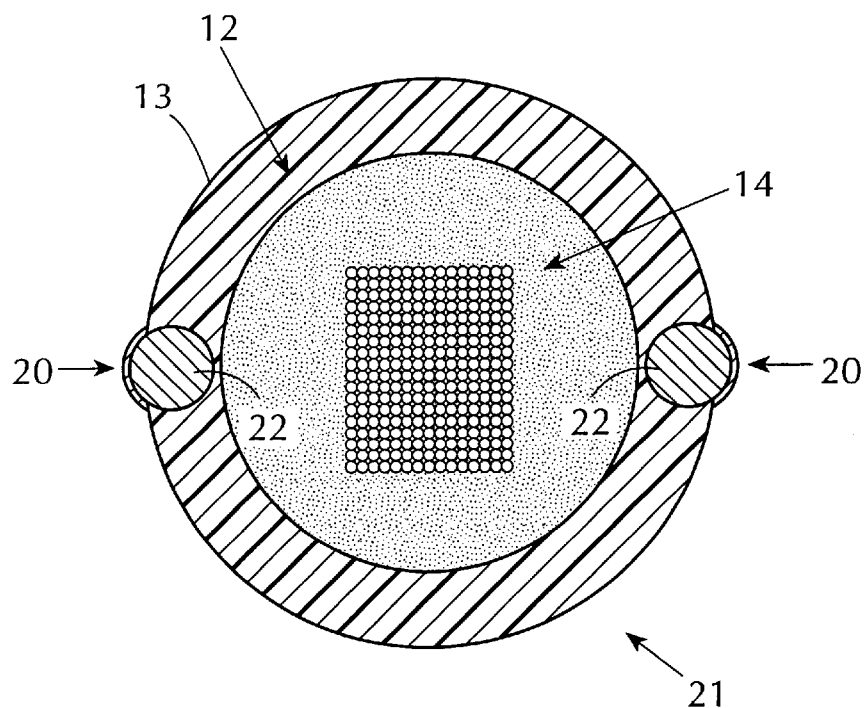
FIG. 2 is an enlarged cross-sectional view of a second embodiment of optical fiber cable core in accordance with the present invention, including a film of buffer tube material over the strength members.

Depending upon the manufacturing process and tolerances, a thin film 20 of buffer tube material may extend between the lip portions 12b and cover those portions of the strength members 22 protruding beyond the nominal outer surface of the buffer tube 22, as shown in the core 21 of FIG. 2. The thin film has a thickness which is small relative to the thickness of the buffer tube wall. For example, the film 20 may have a thickness of up to about 0.1–0.2 mm, while the buffer tube wall may have a thickness of about 2.4 mm. The film 20 can be scraped off of the strength members 22 by one's fingernails or a knife-edge. Longitudinal sections of the strength members 22 can then be removed from the buffer tube 12, as described above. If the radially outermost surface portions of the strength members 22 are tangent to the nominal outer surface of the buffer tube 12, there may also be a similar film of buffer tube material covering those portions, which can be similarly removed.

In order to provide the desired resistance to the expansion and contraction forces of the buffer tube tube 12 and to buckling and kinking of the strength members 22, which because of their small size would buckle or kink with compression forces applied thereto by contraction of the buffer tube 12, it is necessary that the walls of the grooves in the buffer tube tube 12 which receive the strength members 22 tightly engage the outer surfaces of the strength members 22, e.g., apply significant forces directed inward, upon the outer surfaces of the strength members 22, or the strength members 22 must have a relatively strong bond with the walls of the grooves. The latter bond may not be sufficient with some materials used for the strength members 22 and the buffer tube 12. In such case, an adhesive can be applied between the outer surfaces of the strength members 22 and the walls of the grooves. The strength members 22 can also be coated with a material which bonds tightly to the strength members 22 and which, during extrusion of the buffer tube 12, bonds tightly to the walls of the grooves. A cord may be wrapped around the buffer tube and protruding portions of the strength members, as well.

As is known, the resistance (R) to slipping or sliding between two contacting bodies at rest is defined by the formula R=fP, where f is the coefficient of friction and P is the force perpendicular to the contacting surfaces pressing the bodies together. Therefore, in order to provide the desired resistance by the strength members 22 to expansion and contraction of the buffer tube tube 12 when an adhesive or bonding material is not used between the strength members 22 and the walls of the grooves and when other pressure applying means, such as cords or tapes under tension wound around the buffer tube tube 12 containing the strength members 22 or layers, such as a jacket, which apply pressure toward the axis of the buffer tube, are not used, strength members 22 and the buffer tube tube 12 must be selected so as to provide the necessary resistance to slipping of the strength members 22 with respect to the buffer tube 12. Thus, if the desired resistance to slipping and the coefficient of friction is known, the pressure which the walls of the grooves in the buffer tube tube 12 need to apply in the direction of the axis of a strength member 20 can be calculated.

However, the compressibility of the strength members must also be taken into account because if the strength members 22 are soft and easily compressible, the force P cannot be readily obtained, particularly if contraction of the buffer tube wall, which is relatively small, is relied upon to provide the force P. Accordingly, the strength members 22 as a whole must be made of materials which are relatively incompressible, i.e., have a Young's compression modulus of at least about 45–50 GPA, as well as a relatively high tensile strength for resisting expansion and handling forces.

For example, the strength members 22 may be single steel wires or rods, single E-glass rods, glass, aramid or metal wires or fibers embedded in a relatively incompressible resin, such as epoxy resin or steel wires or glass fibers bundled or stranded together and compressed before assembly with the buffer tube tube 12 so as to be substantially incompressible after assembly with the buffer tube 12.

Preferably, metallic wires, such as stainless steel or carbon steel wires, are used. If carbon steel wires are used, they are preferably coated with copper or zinc to prevent corrosion. A high tensile strength, e.g., in the range from about 180,000 psi to about 221,000 psi, is preferred. The diameter of the metallic wires can be in the range of from about 1.00 mm to about 3.00 mm.

Metallic wires are preferred because they can have the same tensile strength as non-metallic rods, with a smaller diameter, reducing the overall diameter of the cable 10.

Whichever type of material is used, the coefficient of thermal expansion and contraction of the strength members 22 is less than that of the buffer tube 12. Preferably, the thermal expansion and contraction coefficient of the strength members 22 is several times smaller than the thermal expansion and contraction coefficient of the buffer tube 12. Also, the tensile modulus of the strength members 22 is substantially greater than the tensile modulus of the buffer tube 12.

As more of the radially outer surface portion of the strength members 22 protrudes beyond the nominal periphery of the buffer tube 12, the strength members 22 become easier to see and to remove. However, greater resistance to thermal expansion and contraction, and to longitudinal loads, is provided when more of the strength members 22 is embedded within the buffer tube 12. The position of the strength members 22 is therefore a compromise between these considerations.

Less than 50% of the outer surface of strength members 22 protrudes beyond the nominal outer surface of the buffer tube 12. Preferably less than about 20%, and more preferably less than about 10% of the outer surface of each of the strength members 22 protrudes outwardly of the nominal outer surface of the buffer tube 12, to provide sufficient coupling between the strength members 22 and the buffer tube tube 12 for the optical fiber cables to withstand a broad operating range of temperature variation and high longitudinal tension forces. Preferably, at least about 1% of the outer surface of each of the strength members 22 protrudes beyond the nominal periphery of the buffer tube tube 12 so that the location of the strength members 22 is readily apparent and the strength members 22 may be readily removed.

However, as mentioned hereinbefore, the strength members 22 can be positioned with respect to the nominal outer surface of the buffer tube tube 12 such that the radially outermost surface portions of the strength members 22 are substantially tangent to the nominal outer surface of the buffer tube 12, as well. The tangential strength members 22 can still be removed by one's fingers, without the use of tools. As above, the strength members 22 can be pressed back into their positions within the buffer tube tube 12 after the slit buffer tube is sealed.

It will be observed from FIGS. 1–3 that the radial thickness of the wall of the buffer tube tube 12 is greater than the diameter of the strength members 22. The purpose is to provide the necessary forces P and to prevent undesirable tearing of the buffer tube tube 12 when a strength member 22 is removed or during manufacture or handling. Accordingly, the wall thicknesses and outer diameter of the buffer tube tube 12 can be greater than that of conventional buffer tubes. The increase in wall thickness can be about equal to the diameter of the strength member 22. Since larger diameter dielectric strength members are generally required to achieve the same tensile strength as steel strength members, buffer tubes including dielectric strength members will generally be thicker than those including steel strength members.

As mentioned hereinbefore, two diametrically opposed strength members 22 are preferably provided. A plane 15, perpendicular to the page in FIG. 1, intersects the center of the buffer tube tube 12 and the longitudinal axis of the strength members 22. The strength members 22 provide a preferred direction of bending of the buffer tube 12, perpendicular to the plane 15. Since it is easier to bend the ribbon stack 14 in a direction transverse to its major surface dimensions 14b, 14c, the plane 15 is preferably parallel to the direction of the major surface dimensions such that the preferred direction of bending defined by the strength members 22 is the same as the easier bending direction of the stack 14. Preferably, when the stack 14 is not twisted, the plane 15 is approximately midway between the upper and lower surfaces of the stack 14. If more than two strength members 22 are provided, equal numbers of strength members 22 are preferably provided proximate and symmetrically arranged with respect to a plane extending through the center of the buffer tube 12, such as the plane 15, to maintain a preferred direction of bending. If more than two strength members 22 are provided, each can have a smaller diameter than when only two strength members 22 are provided. However, providing more than two strength members 22 could increase the number of strength members 22 which need to be removed to gain midspan access and decrease the available space between the strength members 22 for slitting the buffer tube 12, unnecessarily complicating the midspan access process.

Two diametrically opposed strength members 22 in accordance with the preferred embodiment of the present invention are believed to be sufficient to withstand longitudinal tension forces of up to at least about 600 pounds and temperature changes from about −50° C. to about 85° C. without slippage between the strength members 22 and the buffer tube 12.

Preferably, a water blocking material 28 is provided within the buffer tube 12. The water blocking material 28 can be a thixotropic grease or gel, preferably with a viscosity at 20 seconds in the range of from about 8,000 to about 25,000 cps at 125° C. in accordance with ASTM Standard D-2699. The material can contain small particles, preferably of a size less than about 500 microns, of a known water swellable material, such as sodium acrylate, to assist in preventing moisture from affecting the optical fibers. In addition, or in the alternative, compounds for absorbing gas, such as hydrogen, may also be provided to assist in protecting the optical fibers from deleterious gases.

Preferably, water swellable yarn 30 or tape 32 is provided in the open spaces, if present, between the buffer tube tube 12 and the outer jacket 18 or armor shield 34, if provided. The water swellable yarn 30 can be helically wound around the strength members 22 and buffer tube 12, or a plurality of longitudinally extending yarns may be provided around the buffer tube 12. Both yarn 30 and tape 32 may be used concurrently, if desired, as shown in FIG. 1.

Water swellable tape 32 typically comprises two perforate layers which have water swellable particles therebetween. An appropriate tape 32 is sold by Lantor, Inc., Mansfield, Mass., under the trademark FIRET.

Water blocking material 28 could also be used to fill the otherwise empty spaces between the strength members 22 and armor shield 34 or outer jacket 18, instead of the yarn 30 or tape 32. Preferably, the water blocking material used to fill the otherwise empty spaces in the cable is a thixotropic grease or gel having a viscosity at 20 seconds in the range of from about 10–500 cps at 125° C., in accordance with ASTM Standard D-2699. As above, small particles of water swellable material and compounds for absorbing gas may also be provided in the water blocking compound. Other water blocking materials, including the water blocking material 28 described above, could be used, as well.

The water swellable yarn 30 can also be provided within the buffer tube tube 12 instead of the water blocking material 28. However, if the jacket 18 is relied upon for providing part of the force P for resisting longitudinal slipping between the strength members 22 and the buffer tube 12, it is preferable that the buffer tube tube 12 be filled with water blocking material 28. Thus, for example, the wall of the jacket 18 normally is applied in a heated state and contracts when it cools. If the jacket 18 contacts the buffer tube tube 12 and the strength members or if any layers between the jacket 18 and the strength members 22 are substantially incompressible or only slightly compressible radially inwardly of the tube, the cooled jacket 18 will apply a significant radially inward pressure to the strength members 22 and the buffer tube 12. However, if the buffer tube tube 12 is flexible and compressible, as may be the case, the force which the jacket 18 applies to the strength members 22 to press them against the walls of the grooves in the buffer tube tube 12 will be reduced. The water blocking material 28 can be only slightly compressible, and if used to fill the buffer tube 12, such force which the jacket 18 applies to the strength members 22 will not be significantly reduced.

When the preferred method of manufacturing the core, described hereinafter, is used, the desired coupling between the strength members 22 and the buffer tube tube 12 can be obtained, but if desired, the strength members 22 and the buffer tube tube 12 can be wrapped by a cord or tape, as described in said U.S. Pat. No. 5,509,097, to increase the coupling.

Preferably, one or more ripcords 36 extending generally parallel to the longitudinal axis of the cable 10 are provided adjacent to the inner surface of the outer jacket 18 or the inner surface of the armor shield 34, if present, to ease opening of the outer jacket 18, and/or the armor shield 34 when access to the buffer tube tube 12 is required. The ripcords 36 may be aramid cords, for example.

As discussed hereinbefore, the wall thicknesses and outer diameters of the buffer tube tube 12 in the cables and cores of the present invention can be greater than that of conventional buffer tubes. Therefore, it may not be possible to use conventional slitting tools, which are adapted for use with conventionally sized buffer tubes, to achieve midspan access to the optical fibers or optical fiber ribbons. Therefore, it may be desirable to form the buffer tube tube 12 in two separable layers.

It is known in the art that when plastics normally used for buffer tubes are used and a second layer is hot extruded over a first layer, the second layer will bond to the first layer so that it is difficult to strip the second layer from the first layer. This is particularly true when the plastic for both layers in the same in which case a bond, known as a "chemical" bond, is formed between the layers.

Figure 4:
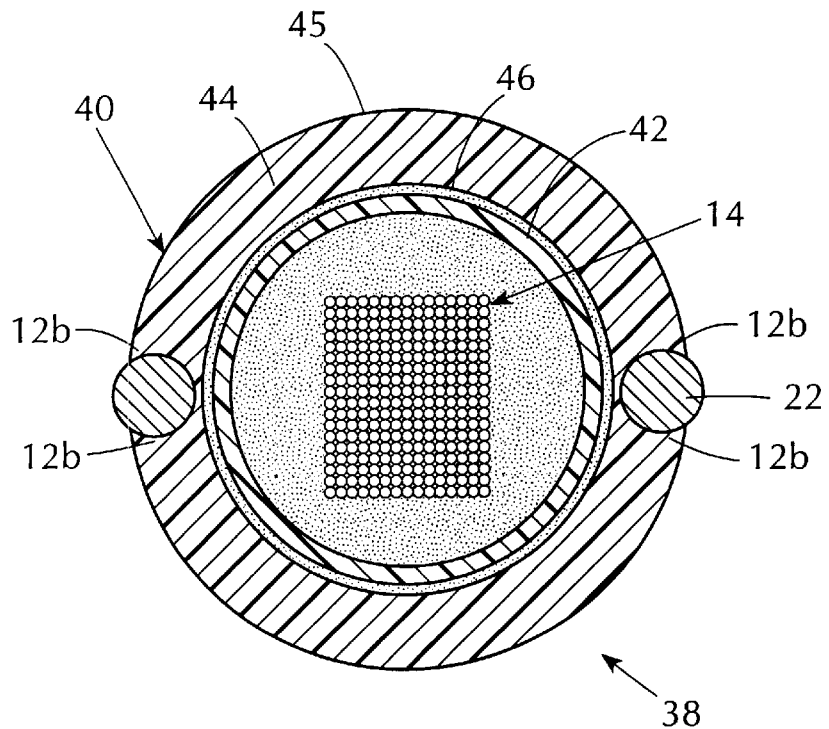
FIG. 4 is an enlarged cross-sectional view of a further embodiment of the invention, wherein the buffer tube has an inner tubular portion, an outer tubular portion and a layer of material therebetween, enabling easy separation of the outer tubular portion from the inner tubular portion.

FIG. 4 is a cross-sectional view of an optical fiber core 38 in accordance with another embodiment of the invention, wherein a buffer tube 40 has an inner tubular portion 42, an outer tubular portion 44 and a thin layer or coating of a material 46 acting as a release agent therebetween. The outer tubular portion 44 has a nominal outer surface 45. The parts shown in FIG. 4 which are the same as the parts shown in FIG. 1 have the same reference numerals. The strength members 22 can have radially outermost surface portions which protrude beyond the nominal outer surface 45, as shown in FIGS. 1 and 4, or can be tangent to the nominal outer periphery 45, or proximate to the nominal outer periphery 45. The release material 46 enables easy removal of the outer tubular portion 44 from the inner tubular portion 42 when the outer tubular portion is pulled away from the inner tubular portion 42 in a direction transverse to their adjacent surfaces, but the release material 46 does not significantly reduce the resistance to slipping of the outer tubular portion 44 with respect to the inner tubular portion 42 in the longitudinal direction of the core. In other words, the coupling between the outer and inner tubular portions 44 and 42 is such that the outer tubular member 44 restrains the inner tubular member 42 with respect to longitudinal movement therebetween.

Appropriate materials for the layer 46 are MS-143DF liquid or MS-122DF aerosol, available from Miller Stephenson Chemical Co., Inc., Menton Grove, Ill., for example. These materials are dry lubricants containing Krytox® DF. (Krytox® is a registered trademark of Dupont.).

According to the manufacturer's specifications, these materials have the following properties:

PTFE

| | |
|---|---|
| Molecular Weight | 3300 |
| Density (grams/cc) | 2.2 |
| Particle Size (microns) | |
| mean | 6 |
| range | 1 to 20 |
| Melting Point | 581° F. (305° C.) |

Dispersion Fluid Solvent HCFC 141b

| | |
|---|---|
| Composition | CH3CCl2F |
| Boiling Point | 89.6° F. (32° C.) |
| Density (grams/cc) | 1.23 @ 25° C. |
| Vapor Pressure | 10 psia @ 20° C. |
| Flashpoint | none |
| Toxicity | 500 ppm approx. (8-hour TWA) |
| Ozone Depletion Potential | 0.11* |

*HCFC 141b is a Class II ozone depleting substance.

The inner tubular portion 42 preferably has the wall thickness equal to or less than the wall thickness of a conventional buffer tube and can therefore be easily accessed and slit during splicing. As described below, the outer portion 44 is extruded over the release material 46 and the inner portion during manufacture. The outer tubular portion 44 contracts as it cools after extrusion, becoming tightly coupled to the inner tubular portion 42 with respect to longitudinal movement relative to each other. The optical fiber cable core 38 in accordance with this embodiment of the invention can be provided with an outer jacket 18 and any of the other components of the optical fiber cable discussed with respect to FIG. 1.

There are various methods for manufacturing the combination of the buffer tube tube 12 and the strength members 22. For example, the buffer tube tube 12 could first be formed with the grooves with a diameter smaller than the diameters of the strength In members 22 and then, the strength members 22 would be pressed into the grooves. However, since the diameter of each strength member 22 is relatively small, it is difficult to control the dimensions of the grooves.

Figure 5:
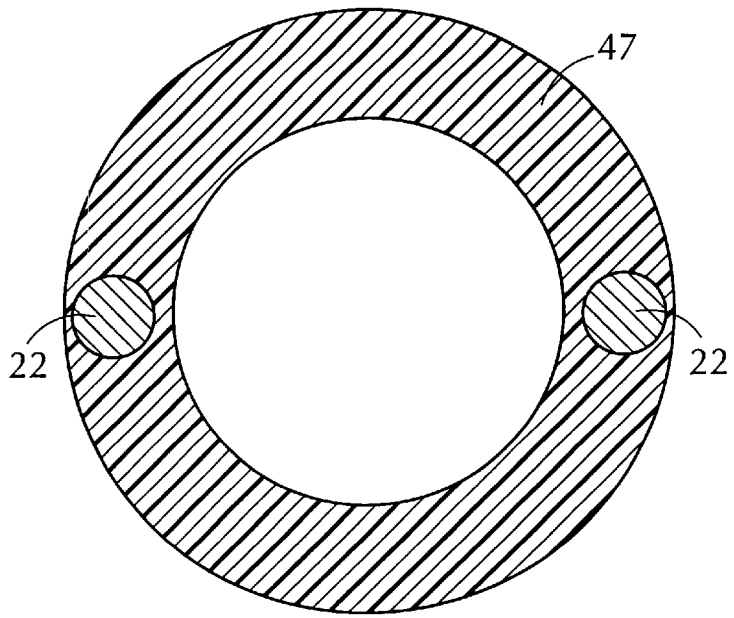
FIG. 5 is an enlarged cross-sectional view of a buffer tube of the core of FIG. 1, after hot extrusion of the buffer tube material and prior to cooling, showing the outermost portions of two strength members essentially tangent to the outer surface of the tube.

In the preferred method of manufacturing a reinforced buffer tube in accordance with the present invention, the longitudinal strength members 22 are embedded within the plastic of the buffer tube tube 12 during the extrusion of the buffer tube material. The reinforced buffer tube tube 12 of FIG. 1 can be manufactured in accordance with the present invention by extruding the plastic of the buffer tube tube 12 and strength members 22 through a circular die. Preferably, the die positions the radially outermost surface portions of the strength members 22 substantially tangent to the nominal outer surface of the extruded buffer tube plastic. A cross-section of the buffer tube material 47 immediately after extrusion is shown in FIG. 5. As the extruded buffer tube material 47 cools it contracts, exposing less than half of the outer surface of the strength members as exposed, as shown in FIG. 1. A thin film 20 of buffer tube material may remain over the strength members 22, as shown in FIG. 2 which enables visual observation of the strength members and which contributes a relatively small amount to the coupling of the strength member to the buffer tube.

If HDPE is used for the plastic of the buffer tube 12, for example, extrusion typically takes place at between about 200–250° C. The extruded buffer tube material 47 may then be cooled in a water trough at about 40° C., as is known in the art. After cooling, the remaining elements of the optical fiber cable 10 are added in manners known in the art.

Tangential placement of the strength members 22 with respect to the periphery of the buffer tube material 47 during extrusion is not required. If the radially outermost surface portions of the strength members 22 are proximate but not tangent to the outermost surface of the buffer tube material 47 when the buffer tube material is extruded, less of the radially outermost surface portions of the strength members 22 will protrude beyond the nominal outer surface of the buffer tube tube 12 after cooling of the extruded buffer tube material 47. The lip portions 12b form as the buffer tube material cools.

By selectively positioning the strength members 22 with respect to the outer surface of the plastic of the buffer tube tube 12 as the plastic is extruded, the position of the radially outermost surface portions of the strength members 22 after cooling of the buffer tube material 47 can be controlled so that the desired amount of the strength members 22 will protrude beyond the nominal outer periphery of the buffer tube 12, or the strength members will be substantially tangent to the nominal outer surface of the buffer tube 12, as shown in FIG. 3.

The die used in the extrusion apparatus can also be configured in a manner known to those skilled in the art so as to avoid covering the outermost portions of the strength members 22 with the plastic during extrusion so that the radially outermost surface portions of the embedded strength members 22 protrude beyond the nominal outer surface of the extruded buffer tube material 47 immediately after extrusion and prior to cooling. In such case, more of the outermost surface portions of the strength members 22 will protrude beyond the nominal periphery of the buffer tube tube 12 after cooling.

The film 20, shown in FIG. 2, for example, can be avoided by placing knife edges at positions opposing the strength members and following the extrusion die, to remove plastic of the buffer tube material tube 12 overlying the strength members 22.

Because of the contraction of the buffer tube material 47 around the strength members 22 as the buffer tube plastic cools, the buffer tube material 47 provides a radial force on the strength members 22, tightly coupling the strength members 22 to the buffer tube 12. This improves the ability of the strength members 22 to resist expansion and contraction of the buffer tube with temperature changes and aids in preventing buckling or kinking of the strength members.

In an alternative method of manufacturing the reinforced buffer tubes tube 12 in accordance with the present invention, the buffer tube is formed in two extrusion steps. First, the plastic for an inner tubular portion 42 of the buffer tube tube 12 is extruded. After the inner tubular portion 42 has stabilized, the plastic forming the outer tubular portion 44 of the buffer tube 40, which, in one embodiment, is the same plastic which is used for the inner tubular portion 42, is extruded over the inner tubular portion while applying the strength member 20 through a die which positions the outermost surface portions of the strength members 22 tangent or nearly tangent to the nominal outer surface of the outer tubular portion 44. As in the method described hereinbefore, as the extruded tube is cooled it contracts. The radially outermost surface portions of the strength members 22 thereby become substantially tangent to or protrude beyond the nominal outer periphery of the outer tubular portion 44, and the outer tubular portion becomes tightly coupled to the inner tubular portion. If the inner and outer tubular portions of the buffer tube are of the same material, they will bond to each other, forming essentially an integral buffer tube 40. The two step extrusion process is preferred if the buffer tube is to be filled with a water blocking compound of grease or gel.

The inner and outer tubular portions 42 and 44 can be of different materials, as well. For example, the inner portion can be HDPE and the outer portion can be MDPE. Since MDPE is softer than HDPE, penetration of the buffer tube for midspan access may be easier. For flame retardance, the outer layer can be PVC. A low-smoke, halogen free outer layer, such as ethylene vinyl acetate with a magnesium or aluminum hydroxide filler may be used where low toxic emissions and flame retardance are desired.

In one embodiment of the buffer tube 40 in accordance with the present invention, made by the two step process of the invention described above, the inner tubular portion of HDPE has a wall thickness of about 0.8mm and an inner diameter of about 6.8 mm. The outer tubular portion, also of HDPE, has a wall thickness (after cooling) of about 1.6 mm. The diameter of the strength members, which in this example are of steel, is also about 1.6 mm. The outer diameter of such a buffer tube tube 12 is about 11.6 mm.

Preferably, in the manufacture of the reinforced buffer tube 40 in the embodiment of FIG. 4, the release material 46 described hereinbefore is applied over the inner tubular portion 42 of the buffer tube 40 after its extrusion. The surface of the inner tubular portion 42 can be wiped with a sponge containing the release material 46, for example. Alternatively, the release material 46 can be sprayed on. Preferably, the layer of release material 46 is between about 1–50 microns, 1–10 microns being most preferred. The outer tubular portion 44 is extruded and the strength members 22 are applied over the layer of release material, as described hereinbefore. As described above, when the outer tubular portion 44 cools it contracts. The outer tubular portion 44 thereby becomes tightly coupled to the inner tubular portion 42 with respect to longitudinal movement therebetween. Radially outermost surface portions of the strength members 22 also become positioned substantially tangent to the nominal outer surface of the outer tubular position or protrude beyond the nominal outer surface such that less than half of the outer surface of the strength members are exposed. However, the outer tubular portion 44 can be easily stripped from the inner tubular portion 42.

Preferred embodiments of the present invention have been described and illustrated. It will be apparent to those skilled in the art that various modifications may be made without departing from the present invention, which is defined in the claims, hereinafter.

What is claimed is:

1. A method of manufacturing a reinforced buffer tube for an optical fiber cable core, the tube having a longitudinal axis encircled by a wall with a nominal outer periphery and of a wall thickness radially of said axis and having longitudinal strength members in said wall, the method comprising:

longitudinally advancing at least two strength members while extruding plastic material heated to a temperature above room temperature onto said strength members to form said tube, said strength members being spaced from each other circumferentially of the tube axis, having a cross-sectional dimension radially of the tube axis which is less than the thickness of said wall and having a coefficient of contraction less than the coefficient of contraction of the plastic material;

while the heated plastic material is being extruded onto the strength members, positioning each of the strength members so that a portion of the outer surface of the strength member is at least substantially as far from the longitudinal axis as the nominal periphery of the tube but so that the peripheral length of each portion is less than 50% of the peripheral length of the outer surface of the strength member; and cooling the plastic material to cause the plastic material to contract and thereby cause the plastic material to apply radially inward forces to said strength members and couple said strength members to said buffer tube.

2. The method of claim 1, wherein said strength members are positioned so that the surface portion of each said strength member is proximate said nominal outer periphery of said buffer tube.

3. The method of claim 1, wherein said strength members are positioned so that the said surface portions of said strength members are substantially tangent to said nominal outer periphery of said buffer tube.

4. The method of claim 1, wherein said strength members are positioned so that the said surface portions of said strength members protrude beyond said nominal outer periphery of said buffer tube.

5. The method of claim 4, wherein said strength members are positioned with respect to said nominal outer periphery of said extruded buffer tube so that less than 20% of the outer surface of each of said strength members protrudes beyond said nominal outer periphery of said buffer tube.

6. The method of claim 1, wherein the strength members are sufficiently radially incompressible to prevent slippage between the strength members and the buffer tube with temperature changes to which the buffer tube is subjected.

7. The method of claim 1, in which a bonding agent which will cause bonding between the strength members and the buffer tube is applied intermediate the strength members and the buffer tube.

8. The method of claim 1 further comprising providing a stabilized inner tube of plastic material radially inwardly of the strength members as the heated plastic material is extruded onto the strength members, extruding the heated plastic material onto the inner tube, contracting around the inner tube during the cooling step and becoming tightly coupled to the inner tube.

9. The method of claim 8, further comprising applying a release agent to the outer surface of said inner tube prior to extruding said heated plastic onto said inner tube.

10. The method of claim 8, wherein said heated plastic material is different from the plastic material of said inner tube.

11. The method of claim 8, wherein the cross-sectional dimension of the strength members is between substantially equal to and greater than the radial thickness of the heated plastic material.

* * * * *

UNITED STATES PATENT AND TRADEMARK OFFICE
CERTIFICATE OF CORRECTION

PATENT NO. : 6,546,176 B2
DATED : April 8, 2003
INVENTOR(S) : Anderson et al.

It is certified that error appears in the above-identified patent and that said Letters Patent is hereby corrected as shown below:

Column 7,
Lines 27, 28, 45, 46, 47, 50, 54 and 56, cancel "tube" (second occurrence);

Column 8,
Line 5, change "05%" to -- 0.05% --;
Lines 4, 6, 12, 14, 20, 52, 54, 62, 64 and 65, cancel "tube" (second occurrence);
Line 50, cancel "tube".

Column 9,
Lines 1, 35, 40, 41, 47, 58 and 59, cancel "tube" (second occurrence);

Column 10,
Lines 3, 25, 30, 51, 55, 58 and 63, cancel "tube" (second occurrence);

Column 11,
Lines 14, 52, 56 and 62, cancel "tube" (second occurrence);

Column 12,
Lines 1, 4, 7, 10, 21 and 67, cancel "tube" (second occurrence);

Column 13,
Lines 24, 28, 31, 37, 40, 47, 49, 57, 60 and 66, cancel "tube" (second occurrence);

Column 15,
Lines 13, 14, 24, 25, 27 and 55, cancel "tube" (second occurrence);
Line 15, cancel "In";

UNITED STATES PATENT AND TRADEMARK OFFICE
CERTIFICATE OF CORRECTION

PATENT NO. : 6,546,176 B2
DATED : April 8, 2003
INVENTOR(S) : Anderson et al.

It is certified that error appears in the above-identified patent and that said Letters Patent is hereby corrected as shown below:

Column 16,
Lines 26, 29 and 67, cancel "tube" (second occurrence).

Signed and Sealed this

Sixteenth Day of September, 2003

JAMES E. ROGAN
*Director of the United States Patent and Trademark Office*